(12) United States Patent
Ziehl

(10) Patent No.: US 6,267,427 B1
(45) Date of Patent: Jul. 31, 2001

(54) TRUCK BED DIVIDER

(76) Inventor: John C. Ziehl, 586 34th St., Allegan, MI (US) 49010

( * ) Notice: Subject to any disclaimer, the term of this patent is extended or adjusted under 35 U.S.C. 154(b) by 0 days.

(21) Appl. No.: 09/610,624

(22) Filed: Jul. 5, 2000

Related U.S. Application Data

(60) Provisional application No. 60/164,481, filed on Nov. 10, 1999.

(51) Int. Cl.[7] .................................................. B60R 13/01
(52) U.S. Cl. ........................ 296/37.6; 296/37.5; 296/39.2; 224/403; 224/925
(58) Field of Search .................................. 296/37.5, 37.6, 296/37.16, 39.2, 97.23, 50; 224/402, 403, 404, 925

(56) References Cited

U.S. PATENT DOCUMENTS

| | | | |
|---|---|---|---|
| 3,025,804 | 3/1962 | Bruning | 105/376 |
| 4,718,584 | 1/1988 | Schoeny | 224/42.42 |
| 4,733,899 | 3/1988 | Keys | 296/24 R |
| 4,875,730 | 10/1989 | Justice | 296/37.5 |
| 4,917,429 | 4/1990 | Giger | 296/37.6 |
| 4,932,705 * | 6/1990 | Miller | 296/50 |
| 5,167,479 | 12/1992 | Bott | 410/121 |
| 5,271,656 * | 12/1993 | Hull et al. | 296/180.1 |
| 5,372,396 | 12/1994 | Van Nahmen | 296/39.2 |
| 5,456,514 * | 10/1995 | Justice | 296/39.2 |
| 5,484,091 | 1/1996 | Malinowski et al. | 224/542 |
| 5,501,384 | 3/1996 | Wisniewski | 224/539 |
| 5,526,972 | 6/1996 | Frazier et al. | 224/539 |
| 5,570,921 | 11/1996 | Brooker | 296/39.1 |
| 5,584,524 * | 12/1996 | Vogel | 296/39.1 |
| 5,715,978 | 2/1998 | Ackeret | 224/42.33 |
| 6,015,071 | 1/2000 | Adomeit et al. | 224/42.34 |
| 6,015,178 | 1/2000 | Haack | 296/39.2 |

FOREIGN PATENT DOCUMENTS

WO88/08379   11/1988   (WO).

* cited by examiner

*Primary Examiner*—D. Glenn Dayoan
*Assistant Examiner*—Paul Chenevert
(74) *Attorney, Agent, or Firm*—Price, Heneveld, Cooper, DeWitt & Litton

(57) ABSTRACT

A pick-up truck cargo bed partitioning system that is indexed to the wheel wells of a pick-up truck includes a planar base configured to lay flat on a floor of a pick-up truck cargo bed generally between the wheel wells of the pick-up truck, and at least one partitioning panel hingedly connected to the base. The partitioning panel is moveable with respect to the base between a first position wherein the partitioning panel is flat on the floor of the pick-up truck cargo bed and a second position wherein the partitioning panel is oriented in an upright position with respect to the floor of the pick-up truck cargo bed to divide the pick-up truck cargo bed into a plurality of compartments. The partitioning system can be easily installed by simply dropping it into the pick-up truck cargo bed with the base portion positioned between the wheel wells, and with the partitioning panel or panels positioned forwardly and/or rearwardly of the wheel wells. Removal of the partitioning system is achieved by lifting the partitioning system from the cargo bed.

9 Claims, 3 Drawing Sheets

TRUCK BED DIVIDER

CROSS-REFERENCE TO RELATED APPLICATION

This application claims priority under 35 U.S.C. § 119(e) on U.S. Provisional Application No. 60/164,481 entitled SELF STORING TRUCK BED DIVIDER, filed Nov. 10, 1999, by John C. Ziehl, the entire disclosure of which is incorporated herein by reference.

FIELD OF THE INVENTION

This invention relates generally to a space organizing partition system for use in the cargo bed of a pick-up truck, and more particularly to a partitioning system for a pick-up truck that divides the cargo bed into separate compartments suited for restraining various articles stored in the cargo bed of a pick-up truck against movement, and thus protecting stored articles against impact, damage and scattering.

BACKGROUND OF THE INVENTION

A well recognized problem with transporting groceries and the like in the cargo bed of a pick-up truck is that such items if left unrestrained can slide around, spill out, and crash into each other and/or the walls of the pick-up truck cargo bed. As a result, groceries and/or other items can become scattered around in the pick-up truck cargo bed, and can be damaged as the items roll around crashing into each other and/or the walls of the cargo bed.

Ropes, bungie cords, cargo nets and the like have been used in an attempt to restrain articles such as groceries to prevent damage during transport in a pick-up truck cargo bed.

However, the use of these types of restraints has not been well accepted by pick-up truck owners and drivers because ropes, cords and nets are relatively difficult to use and are not always effective. Further, these types of devices are unpopular with many pick-up truck owners because they typically require drilling holes into the walls of the pick-up truck cargo bed or otherwise modifying the cargo bed in a manner that may permanently alter the appearance of the vehicle.

A more popular solution to the problem of preventing groceries and the like from moving around in a pick-up truck cargo bed has been to provide partitions that divide the cargo bed into two or more compartments generally with at least one of the compartments being relatively small (e.g., comparable to the dimensions of an automobile trunk) so that shifting of articles transported in the cargo bed is constrained to the dimensions of the compartment. The use of such partitions to provide compartmentalization of the cargo bed has proven effective at eliminating or at least significantly reducing spillage, scattering and damage to groceries and other like articles. However, many of the proposed pick-up truck cargo bed partitioning systems have other disadvantages when the pick-up truck is not being used for transporting groceries or the like. A first disadvantage with many of the known pick-up truck cargo bed partitioning systems is that they are permanently mounted to the pick-up truck bed with fasteners such as bolts or the like. In many cases these partition systems can only be removed with tools and with considerable effort. Such systems are undesirable because they severely detract from the utility and appearance of the vehicle when they are installed. In many cases, if one wishes to use the full length of the pick-up truck cargo bed, the partitioning system must be removed and stored at a secure location, usually in the pick-up truck owners garage. Thereafter, the pick-up truck owner must remember to reinstall the partition system before transporting groceries or the like. This is a considerable inconvenience. Additionally, the pick-up truck owner must reserve storage space, such as in a garage, for the partition system when it is not being used. Another disadvantage is that even when certain known partitioning systems are removed from the cargo bed, mounting brackets installed into the cargo bed such as by welding or riveting remain. Many pick-up truck owners regard such mounting brackets as undesirable because they impair the appearance of the vehicle and permanently alter or scar the vehicle.

Another proposed solution to the problem of restraining articles, such as groceries, with a partitioning system has been to provide a prefabricated, molded plastic pick-up truck bed liner with an integral partitioning system including a partition that is hinged to the floor of the bed liner so that it folds flat against the floor when it is not in use. This system has many advantages over other systems that must be removed to use the full available area of the cargo bed. However, there are some pick-up truck owners that prefer not to have a molded liner, often because molded liners that are dropped into the cargo bed and secured thereto are known to trap moisture between the metal floor of the pick-up truck bed and the plastic liner, accelerating deterioration due to moisture induced oxidation. Also, spray-in pick-up truck cargo bed liners are becoming increasingly popular because they have a better appearance and because they are intimately bonded to the steel floor and walls of the pick-up truck cargo bed, such that moisture cannot collect between the metal floor and liner or between the metal walls and liner. However, the known spray-in pick-up truck cargo bed liners do not include a integral partitioning system, nor is it obvious how an integral partitioning system may be incorporated into a spray-in liner.

Another proposed solution to the problem of providing a pick-up truck cargo bed partition system is a portable divider device including an elongated support plate that conforms to the configuration of wheel wells projecting into the truck bed, and a baffle plate that is mounted perpendicularly on the plate. The baffle is mounted onto the support plate by an interlocking peg and hole connection arrangement. A disadvantage is that when it is desired to use the entire area of the cargo bed, the baffle must be lifted out away from the support plate, and must be stored either at a secure location, such as in the pick-up truck owner's garage, or in the pick-up truck bed where it at least partially interferes with the ability to fully utilize all of the space in the pick-up truck cargo bed. Another problem with this partition system is that it is difficult to install and remove the baffle when a tonneau cover is installed, because the baffle must be lifted straight up from the support plate to lift the pegs of the baffle out of the holes in the support plate.

SUMMARY OF THE INVENTION

The invention pertains to a pick-up truck cargo bed partitioning system that overcomes the problems associated with known partitioning systems for dividing the space in the cargo bed of a pick-up truck. In particular, the invention provides a pick-up truck cargo bed partitioning system that does not require any permanent modifications to the pick-up truck. For example, the partitioning system of this invention does not require drilling holes into the walls or floor of the pick-up truck cargo bed, and does not require fastening any type of brackets to the pick-up truck. Another advantage with the invention as compared with known pick-truck cargo bed partitioning systems is that the partitioning system of the invention does not require any tools for installation or removal. Instead, the partitioning system of this invention is installed by dropping it into place between the wheel wells of the pick-up truck cargo bed, and removed by lifting it out of the cargo bed. Another advantage of the pick-up truck bed of this invention as compared with many of the known partitioning systems for pickup truck beds is that the partitioning system of the invention can be stored flat against the floor of the pick-up truck bed so that the full space of the pick-up truck bed may be utilized without interference from the partitioning system, and without removing the partitioning system.

All of the above advantages are achieved in a partitioning system that includes a planar base configured to lay flat on a floor of a pick-up truck cargo bed generally between the wheel wells of the pick-up truck, and a partitioning panel hingedly connected to the planar base. The partitioning panel is pivotally moveable with respect to the base between a first position wherein the partitioning panel lays flat on the floor of the pick-up truck cargo bed and a second position wherein the partitioning panel is oriented at an angle with respect to the floor of the pick-up truck cargo bed to divide the pick-up truck cargo bed into compartments. The partitioning system is indexed to the wheel wells of the pick-up truck to restrain the partitioning system against translational movement along the floor of the pick-up truck cargo bed and retain the base in a substantially fixed position between the wheel wells with the base laying flat against the floor of the pick-up truck cargo bed.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
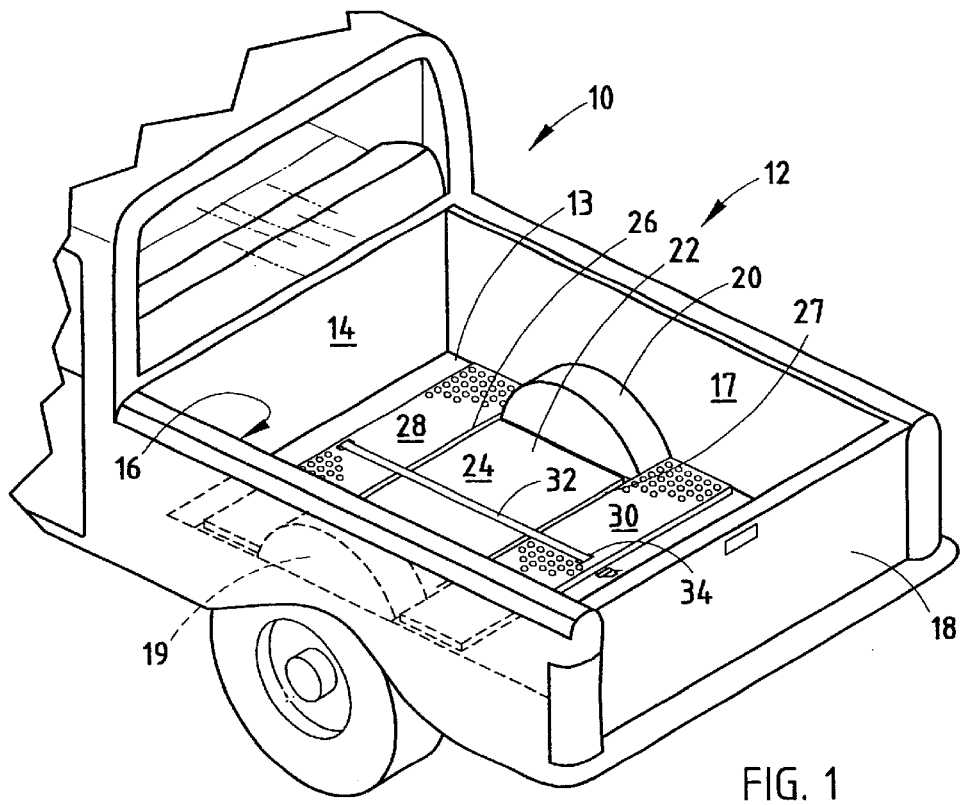
FIG. 1 is perspective view of a pick-up truck with a partitioning system in accordance with an embodiment of the invention having two partitioning panels hingedly connected to a base plate, wherein the partitioning panels are laying flat against a floor of the pick-up truck bed.

In FIG. 1, there is shown a pick-up truck 10 including a cargo bed 12 defined by front wall 14, left side wall 16, right side wall 17, and a rear lift gate 18. A left wheel well 19, and a right wheel well 20 project inwardly from left side wall 16 and right side wall 17 respectively.

Figure 2:
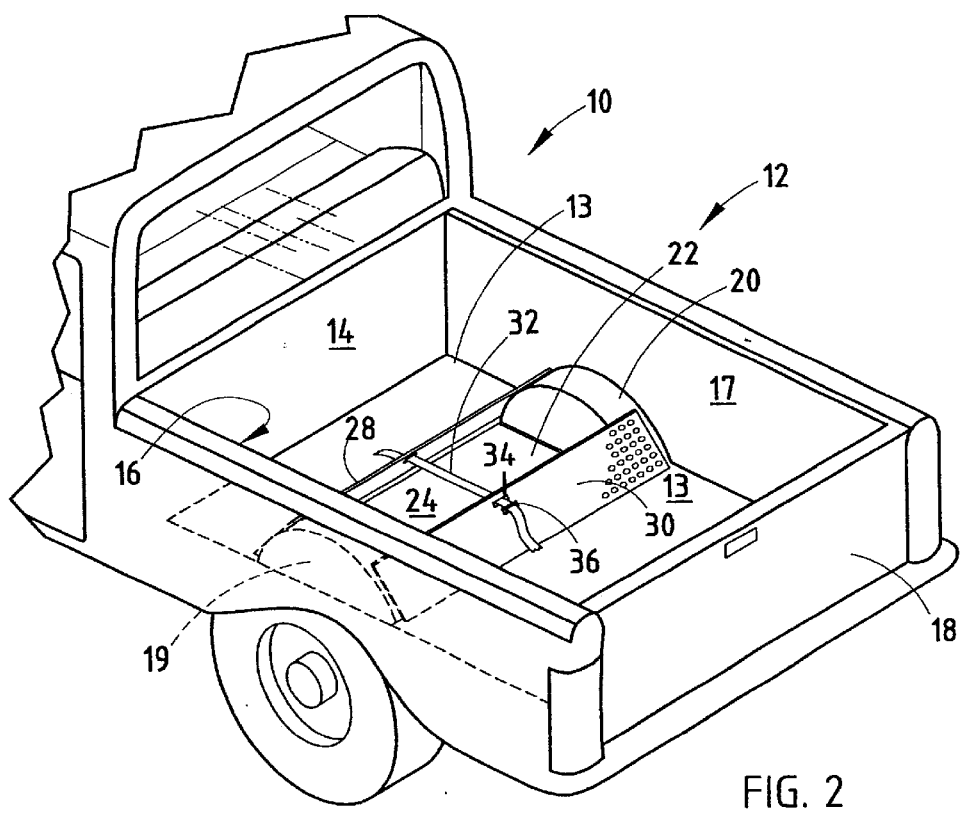
FIG. 2 is a perspective view of the partitioning system of FIG. 1 shown with the partitions in an upright position, whereby the pick-up truck bed is divided into a plurality of compartments.
Figure 3:
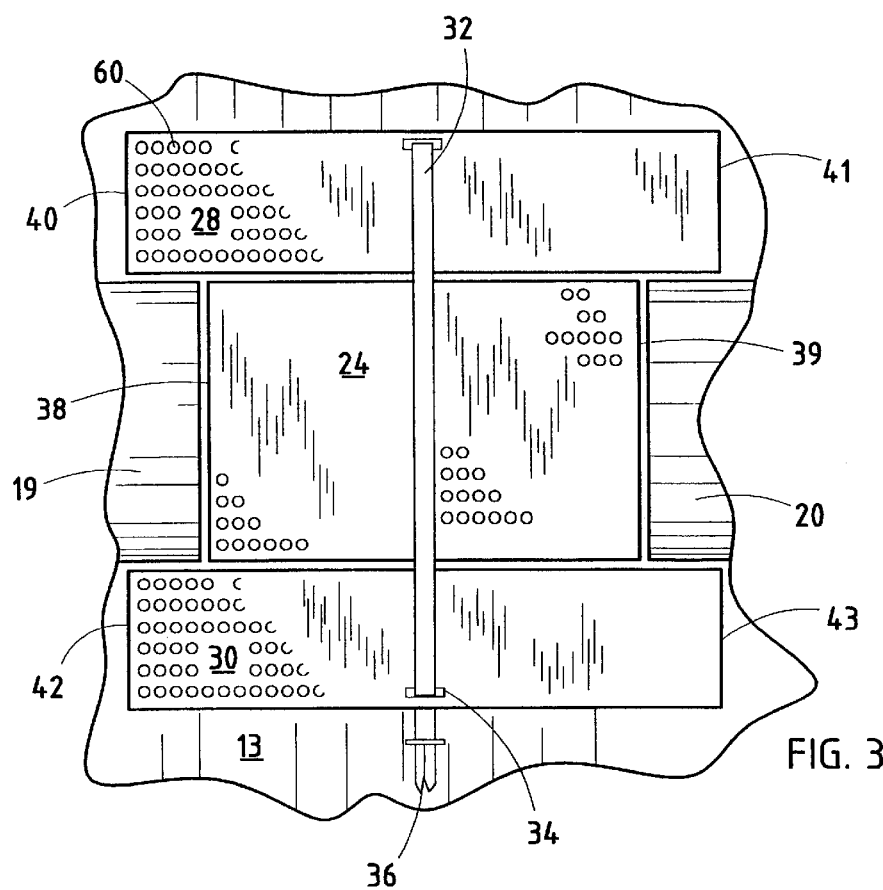
FIG. 3 is a top plan view of the partitioning system of FIG. 1, shown with the partitioning panels oriented parallel with the base plate.
Figure 4:
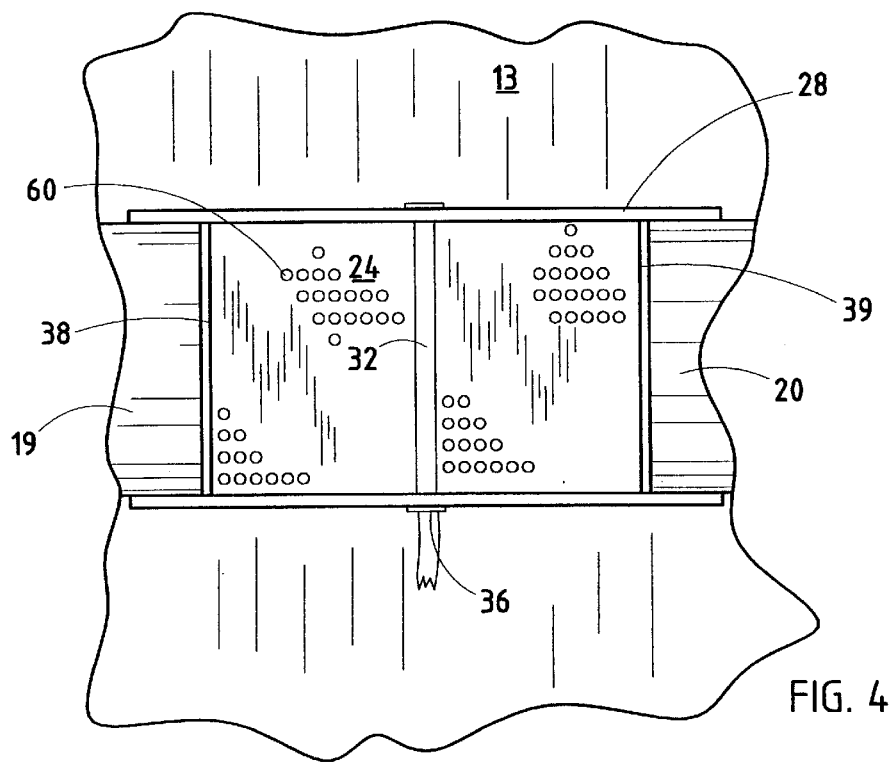
FIG. 4 is a top plan view of the partitioning system shown in FIGS. 1–3, with the partitions raised into an upright position.

As shown in FIGS. 1–4, a partitioning system 22 for dividing a cargo bed of a pick-up truck into a plurality of compartments includes a planar base 24 that is configured to lay flat on floor 13 of cargo bed 12 generally between wheel wells 19 and 20. The base 24 has a transverse forward edge 26 that extends across the floor of the pick-up truck bed at a location forward of wheel wells 19 and 20, and a transverse rearward edge 27 that extends across the floor of the pick-up truck bed rearward of wheel wells 19 and 20. Hingedly connected to transverse forward edge 26, is a first partitioning panel 28. Partitioning panel 28 is pivotally moveable with respect to base 24 between a first position wherein partitioning panel 28 lays flat on floor 13 of cargo bed 12 as shown in FIG. 1, and a second position wherein partitioning panel 29 is oriented at an angle with respect to floor 13 of pick-up truck cargo bed 12 to divide the cargo bed 12 into a plurality of separate compartments as shown in FIG. 2. The illustrated embodiment of FIGS. 1–4 also includes a second partitioning panel 30 hingedly connected to transverse edge 27 of base 24. Second partitioning panel 30 is pivotally moveable with respect to base 24 between a first position wherein partitioning panel 30 lays flat on floor 13 of pickup truck cargo bed 12 as shown in FIG. 1, and a second position wherein partitioning panel 30 is oriented at an angle with respect to floor 13 of pick-up truck cargo bed 12 to divide cargo bed 12 into a plurality of compartments as shown in FIG. 2.

As shown in FIG. 2, the angle between first partitioning panel 28 and base 24, and the angle between second partition panel 30 and base 24, may be determined by the shape of wheel wells 19 and 20. In the embodiment illustrated in FIG. 2, panels 28 and 30 are pivoted upwardly away from floor 13 and rotated toward wheel wells 19 and 20 until they lay up against forwardly and rearwardly facing surfaces respectively of wheel wells 19 and 20. In the illustrated embodiment, partitioning panels 28 and 30 are maintained in the position shown in FIG. 2 by a strap 32 fixed at one end to first partitioning panel 28, threaded through an opening 34 of second positioning panel 30, and through a strap clamp 36.

An important aspect of the invention is that the partitioning system 22 is indexed to wheel wells 19 and 20 of pick-up truck 10 to restrain partitioning system 22 against translational movement along floor 13 of cargo bed 12 and retain base 24 in a substantially fixed position between wheel wells 19 and 20 with base 24 laying flat against floor 13 of cargo bed 12. In the embodiment shown in FIGS. 1–4, base 24 is a generally rectangular shaped panel having lateral edges 38 and 39 (FIGS. 3 and 4) that abut wheel wells 19 and 20, or are at least in close proximity to wheel wells 19 and 20, so that base 24 and partitioning system 22 will not slide from side-to-side when pick-up truck 10 is accelerated, decelerated, or steered left or right. Partitioning panels 28 and 30 also have a generally rectangular shape and include lateral edges 40, 41, 42 and 43. The distance between opposing lateral edges 40 and 41 of first partitioning panel 28 is greater than the distance between wheel wells 19 and 20. Similarly, the distance between lateral edges 42 and 43 of second partitioning panel 30 is greater than the distance between wheel wells 19 and 20. The distance between panel 28 and panel 30 is about equal to the distance between transverse edges 26 and 27 of base 24. The combination of geometric features of partitioning system 22 prevent any substantial movement of partitioning system 22 with respect to the pick-up truck 10. In particular, any substantial rearward movement of partitioning system 22 is prevented by engagement of partitioning panel 28 with wheel wells 19 and 20, and any forward movement of partitioning system 22 with respect to floor 13 of cargo bed 12 is prevented by engagement of partitioning panel 30 with wheel wells 19 and 20. Any substantial lateral movement of partition system 22 is prevented by engagement of lateral edges 38 and 39 of base 24 with wheel wells 19 and 20.

Figure 5:
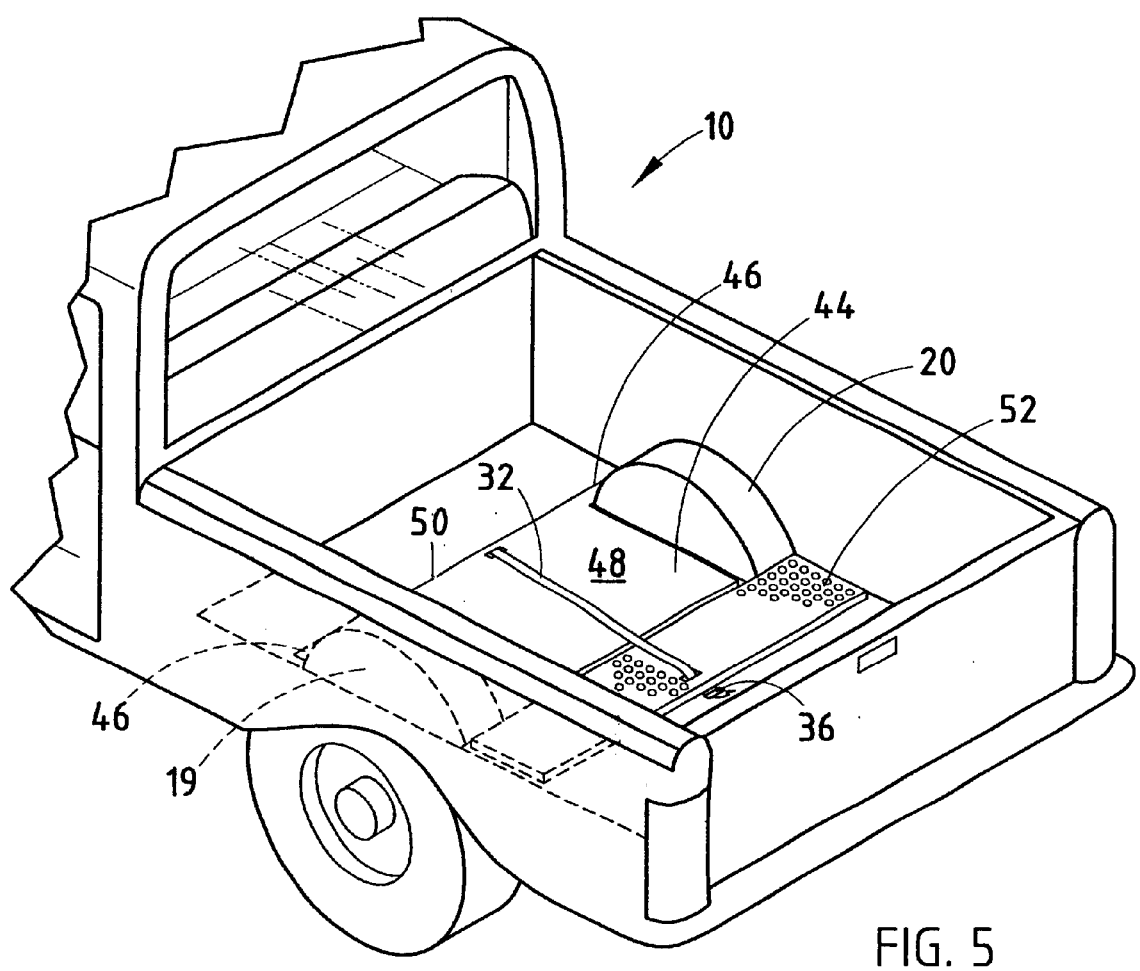
FIG. 5 is a perspective view of a partitioning system having a single partitioning panel in accordance with another embodiment of the invention.

The embodiment of FIGS. 1–4 illustrates a partitioning system having two partitioning panels 28 and 30 that divide pick-up truck bed 12 into three separate compartments. Also, in the illustrated embodiment of FIGS. 1–4, partitioning panels 28 and 30 cooperate with base 24 to prevent any substantial translational movement of partitioning system 22 with respect to cargo bed 12. However, as shown in FIG. 5, a partitioning system 44 in accordance with an alternative embodiment of the invention may comprise a single partition that divides cargo bed 12 into two separate compartments rather than three separate compartments. Rearward movement of partitioning system 44 is prevented by indexing tabs 46 that extend laterally from base 48 of partitioning system 44 in opposing directions, generally in alignment with transverse edge 50 of base 48. Partitioning panel 52 of partitioning system 44 has a transverse length (i.e., the length between lateral edges of the panel) sufficient to enable engagement of partitioning panel 52 with wheel wells 19 and 20. Thus, partitioning system 44 is indexed to wheel wells 19 and 20 of pick-up truck 10 to restrain partitioning system 44 against translational movement along floor 13 of pick-up truck cargo bed 12 and retain base 48 in a substantially fixed position between wheel wells 19 and 20 with base 48 laying flat against floor 13 of the cargo bed.

Those having ordinary skill in the art will appreciate that various alternative designs may be employed to achieve a partitioning system that is indexed to the wheel wells of a pickup truck in accordance with the principles of this invention to restrain the partitioning system against translational movement along the floor of the pick-up truck cargo bed and retain the base in a substantially fixed position between the wheel wells with the base laying flat against the floor of the pick-up truck cargo bed. Such alternative indexing features are intended to be encompassed by the appending claims.

In the illustrated embodiments, a strap 32 and strap clamp 36 are used for maintaining the partitions in an upright position to divide cargo bed 12 into separate compartments. However, various other devices may be used for holding a partitioning panel in an upright position with respect to the base of the partitioning system. For example, various rope and/or cord arrangements may be used for holding the partitioning panels in an upright position. Other suitable devices for holding the partitioning system in an upright position include various latching arrangements. Such devices are well known, and do not constitute a critical aspect of the invention. An upright position for the partitioning panels of the partitioning system of this invention refers to a position in which the partitioning panel is pivoted upwardly away from the floor of the pick-up truck to effectively define compartments that are separated by the partitioning panel. A suitable upright position will typically be achieved when the partitioning panel is pivoted from about 60 degrees to about 120 degrees from the floor of the pick-up truck cargo bed, and more preferably from about 90 degrees to 120 degrees.

The hinge connection between partitioning panel or panels and the base may include any suitable hinge, including a piano-type hinge, a door type hinge, or even a living hinge (e.g., a thin, flexible, substantially continuous connection, such as an integral plastic connection, between the panel and the base). The particular manner in which the panel or panels are hingedly connected to the base is not critical to the invention and various hinge devices suitable for use with the invention will be readily apparent to those having ordinary skill in the art.

The partitioning panel or panels and base may be made of generally any relatively rigid, relatively durable material. Examples of suitable materials include metal, wood and plastic, with plastic materials being preferred on account of their lightness in weight, durability, and relatively low cost.

As shown in the drawings, the base and partitioning panel preferably include a plurality of apertures or openings 60. This allows air to pass through the panels when they are in an upright position to reduce form drag and thereby reduce wind forces on the partitioning panels and on strap 32 and strap clamp 36 or on other devices for retaining the partitioning panels in an upright position. Openings 60 also prevent a pressure differential from being created on opposite sides of the base and on opposite sides of the panel 52 or panels 28, 30 when the panels are laying flat on the floor of the pick-up truck cargo bed to prevent aerodynamic lift from urging the partitioning panels and base plate upwardly when the pick-up truck is traveling at a relatively high rate of speed. Although openings 60 in the illustrated embodiments are circular openings 60, elongated openings, slits, and openings having generally any shape may be used if desired.

The cargo bed partitioning systems of this invention are installed into the cargo bed of a pick-up truck by simply dropping the partitioning system into the cargo bed of the pick-up truck with the base portion positioned between the wheel wells and with the partitioning panel or panels located forwardly, rearwardly, or both forwardly and rearwardly of the wheel wells (depending upon whether the partitioning system includes one or two partitioning panels), as shown in the drawings. Installation does not require any tools or brackets affixed to the pickup truck. The partitioning system may be easily removed without tools by merely lifting the partitioning system out of the pick-up truck cargo bed. Various retaining devices may be used for holding the partitioning panels in an upright position (such as shown in FIG. 2). With the embodiment illustrated in FIG. 2, it is possible to easily pivot the partitions into an upright position by pulling strap 32 rearwardly (toward lift gate 18) to raise first partitioning panel 28 to an upright position, and then pulling strap 32 in a generally upward direction and slightly forward (toward the cab) to raise second partitioning panel 30 to an upright position. Thereafter, strap clamp 36 is unlocked and slid forwardly against second partitioning panel 30 as strap 32 is pulled rearwardly, and strap clamp 36 is then locked onto strap 32 when the portion of strap 32 extending between panels 28 and 30 is taut. When it is desired to utilize the entire length of the pick-up truck bed, partitioning panels 28 and 30 can be easily folded downwardly flat against the floor of the pick-up truck cargo bed by unlocking or releasing strap clamp 36 and simply pivoting panels 28 and 30 downwardly toward the floor of the cargo bed.

Advantages of the partitioning system include the ability to install and remove the partitioning system without tools, the ability to use the partitioning system without having to modify the pick-up truck by attaching brackets or other mounting devices, the ability to store the partitioning system flat against the floor of the cargo bed so that the full length and width of the cargo bed can be utilized without removing the partitioning system, and the ability to easily modulate the system between its partitioning and stored states from the tailgate end with a bed cap or tonneau cover in place.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A pick-up truck cargo bed partitioning system indexed to the wheel wells of the pick-up truck, comprising:

a planar base configured to lay flat on a floor of a pick-up truck cargo bed generally between the wheel wells of the pick-up truck, the base having a transverse forward edge configured to extend across the floor of the pick-up truck bed forward of the wheel wells, a transverse rearward edge configured to extend across the floor of the pick-up truck cargo bed rearward of the wheel wells;

a discrete partitioning panel hingedly connected to a first of the transverse edges of the base, the discrete partitioning panel being pivotably movable with respect to the base between a first position wherein the discrete partitioning panel lays flat on the floor of the pick-up truck cargo bed and a second position wherein the discrete partitioning panel is oriented in an upright position with respect to the floor of the pick-up truck cargo bed to divide the pick-up truck cargo bed into compartments; and wherein the partitioning system is indexed to the wheel wells of the pick-up truck to restrain the partitioning system against translational movement along the floor of the pick-up truck cargo bed and retain the base in a substantially fixed position between the wheel wells with the base laying flat against the floor of the pick-up truck cargo bed.

2. The pick-up truck cargo bed partitioning system of claim 1, wherein the partitioning system is indexed to the wheel wells by indexing tabs that project laterally from the planar base.

3. The pick-up truck cargo bed partitioning system of claim 1, wherein the base includes two indexing tabs that extend laterally from the base in opposing directions, generally in alignment with a second of the transverse edges of the base, and wherein the discrete partitioning panel has a transverse length sufficient to enable engagement of the discrete partitioning panel with the wheel wells.

4. The pick-up truck cargo bed partitioning system of claim 1, wherein the planar base and the discrete partitioning panel have a plurality of openings that allow air to pass from one side of the partitioning system to the other side of the partitioning system, whereby form drag, aerodynamic lift, or both are prevented.

5. The pick-up truck cargo bed partitioning system of claim 1, further comprising a second discrete partitioning panel hingedly connected to a second of the transverse edges of the base, the second discrete partitioning panel being pivotably moveable with respect to the base between a first position wherein the second discrete partitioning panel lays flat on the floor of the pick-up truck cargo bed and a second position wherein the discrete partitioning panel is oriented at an angle with respect to the floor of the pick-up truck cargo bed to divide the pick-up truck cargo bed into compartments.

6. The pick-up truck cargo bed partitioning system of claim 5, wherein the partitioning system is indexed to the wheel wells by the two discrete partitioning panels, the discrete partitioning panels being configured to engage forwardly facing and rearwardly facing surfaces of the wheel wells to prevent forward and rearward translational movement along the floor of the pick-up truck cargo bed, and lateral edges of the base being located in adjacent proximity to the wheel wells to prevent lateral movement of the partitioning system with respect to the floor of the pick-up truck cargo bed.

7. A pick-up truck cargo bed partitioning system indexed to the wheel wells of the pick-up truck, comprising:

a planar base configured to lay flat on a floor of a pick-up truck cargo bed generally between the wheel wells of the pick-up truck, the base having a transverse forward edge configured to extend across the floor of the pick-up truck bed forward of the wheel wells, a transverse rearward edge configured to extend across the floor of the pick-up truck bed rearward of the wheel wells;

a partitioning panel hingedly connected to a first of the transverse edges of the base, the partitioning panel being pivotably movable with respect to the base between a first position wherein the partitioning panel lays flat on the floor of the pick-up truck cargo bed and a second position wherein the partitioning panel is oriented in an upright position with respect to the floor of the pick-up truck cargo bed to divide the pick-up truck cargo bed into compartments;

a second partitioning panel hingedly connected to a second of the transverse edges of the base, the second partitioning panel being pivotably movable with respect to the base between a first position wherein the second partitioning panel lays flat on the floor of the pickup truck cargo bed and a second position wherein the partitioning panel is oriented at an angle with respect to the floor of the pick-up truck cargo bed to divide the pick-up truck cargo bed into compartments;

wherein the partitioning system is indexed to the wheel wells of the pick-up truck by the base and the two partitioning panels to restrain the partitioning system against translational movement along the floor of the pick-up truck cargo bed and retain the base in a substantially fixed position between the wheel wells with the base laying flat against the floor of the pick-up truck cargo bed, the partitioning panels being configured to engage forwardly facing and rearwardly facing surfaces ol the wheel wells to prevent forward and rearward translational movement along the floor of the pick-up truck cargo bed, and lateral edges of the base being located in adjacent proximity to the wheel wells to prevent lateral movement of the partitioning system with respect to the floor of the pick-up truck cargo bed; and a strap connected at one end to a first of the partitioning panels and threaded through an opening in the second partitioning panel, and a strap clamp disposed on the strap to selectively hold the partitioning panels in an upright position.

8. A pick-up truck cargo bed partitioning system indexed to the wheel wells of the pick-up truck, comprising:

a rigid planar base configured to lay flat on a floor of a pick-up truck cargo bed generally between the wheel wells of the pick-up truck, the base having a transverse forward edge configured to extend across the floor of the pick-up truck bed forward of the wheel wells, a transverse rearward edge configured to extend across the floor of the pick-up truck cargo bed rearward of the wheel wells;

a rigid partitioning panel hingedly connected to a first of the transverse edges of the base, the partitioning panel being pivotably movable with respect to the base between a first position wherein the partitioning panel lays flat on the floor of the pick-up truck cargo bed and a second position wherein the partitioning panel is oriented in an upright position with respect to the floor of the pick-up truck cargo bed to divide the pick-up truck cargo bed into compartments; and wherein the partitioning system is indexed to the wheel wells of the pick-up truck to restrain the partitioning system against translational movement along the floor of the pick-up truck cargo bed and retain the base in a substantially fixed position between the wheel wells with the base laying flat against the floor of the pick-up truck cargo bed.

9. A pick-up truck cargo bed partitioning system indexed to the wheels wells of the pickup truck, comprising:

a planar base configured to lay flat on a floor of a pick-up truck cargo bed generally between the wheel wells of the pick-up truck;

a partitioning panel hingedly connected to the base, the partitioning panel being pivotably movable with respect to the base between a first position wherein the partitioning panel lays flat on the floor of the pick-up truck cargo bed and a second position wherein the partitioning panel is oriented in an upright position with respect to the floor of the pick-up truck cargo bed to divide the pick-up truck cargo bed into compartments;

wherein the partitioning system is indexed to the wheel wells of the pick-up truck to restrain the partitioning system against translational movement along the floor of the pick-up truck cargo bed and retain the base in a substantially fixed position between the wheel wells with the base laying flat against the floor of the pick-up truck cargo bed; and wherein the planar base and the partitioning panel have a plurality of openings that allow air to pass from one side of the partitioning system to the other side of the partitioning system, whereby form drag, aerodynamic lift, or both are prevented.

* * * * *